United States Patent [19]
Bader, deceased et al.

[11] 3,846,438
[45] Nov. 5, 1974

[54] CERTAIN 1,2,4-THIADIAZOLES

[75] Inventors: Jorg Bader, deceased, late of Arlesheim, Switzerland by Dagmar Bader-Ludwig, legal representative; Heinz Hambock, Binningen, Switzerland; Elmar Sturm; Anton Georg Weiss, both of Benken/Bl, Switzerland

[73] Assignee: Ciba-Geigy Corporation, Ardsley, N.Y.

[22] Filed: Aug. 28, 1972

[21] Appl. No.: 284,198

[30] Foreign Application Priority Data
Aug. 31, 1971 Switzerland.................. 12796/71
Aug. 15, 1972 Switzerland.................. 12053/72

[52] U.S. Cl...... 260/302 SD, 260/306.8 D, 424/270
[51] Int. Cl............................................. C07d 91/60
[58] Field of Search............... 260/302 SD, 306.8 D

[56] References Cited
UNITED STATES PATENTS

| | | | |
|---|---|---|---|
| 2,358,031 | 9/1944 | Roblin et al. | 260/306.8 D |
| 3,260,725 | 7/1966 | Schroeder | 260/306.8 D |
| 3,692,794 | 9/1972 | Rosen et al. | 260/302 SD |
| 3,736,328 | 5/1973 | Wittenbrook et al. | 260/302 SD |

FOREIGN PATENTS OR APPLICATIONS

| 17,998 | 11/1962 | Japan | 260/302 SD |
|---|---|---|---|

OTHER PUBLICATIONS
Wagner et al., Synthetic Organic Chemistry, N.Y. John Wiley & Sons, 1953, pp. 801–802.

*Primary Examiner*—Richard J. Gallagher
*Attorney, Agent, or Firm*—Frederick H. Rabin; Karl F. Jorda

[57] ABSTRACT

Thiadiazole derivatives of the formula

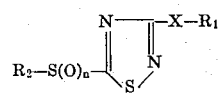

wherein
$R_1$ represents an alkyl radical having 1–4 carbon atoms, unsubstituted, or mono- to trisubstituted by halogen alkoxy or alkylamino each having at most four carbon atoms, an alkenyl radical having 2–4 carbon atoms, or a cycloalkyl or cycloalkenyl radical having 3–7 carbon atoms,
X represents oxygen, sulphur or an alkylimino group,
$R_2$ represents an alkyl radical having 1–4 carbon atoms, unsubstituted, or mono- to disubstituted by halogen, and
n represents 1 or 2, useful as antimicrobial substance.

6 Claims, No Drawings

CERTAIN 1,2,4-THIADIAZOLES

The present invention relates to new thiadiazole derivatives, to processes for their production, to agents containing the new substances, as well as to the use thereof.

The new thiadiazole derivatives correspond to formula I

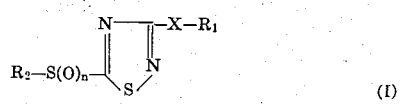

wherein $R_1$ represents an alkyl radical having 1–4 carbon atoms, unsubstituted, or mono- to trisubstituted by halogen, alkoxy or alkylamino each having at most four carbon atoms, an alkenyl radical having 2–4 carbon atoms, or a cycloalkyl or cycloalkenyl radical having 3–7 carbon atoms, X represents oxygen, sulphur or an alkylimino group, $R_2$ represents an alkyl radical having 1–4 carbon atoms, unsubstituted, or mono- to disubstituted by halogen, and n represents 1 or 2.

The alkyl group having 1–4 carbon atoms occurring in the above formula I as $R_1$ and $R_2$ can be straight chain or branched.

New thiadiazole derivatives of formula I wherein n represents 2 are produced according to the invention by the reaction of a 5-chlorothiadiazole of formula II

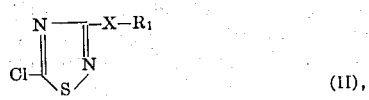

wherein $R_1$ and X have the meanings given under formula I, with a compound of formula III $$R_2 - S(O)_n - Me$$
(III)

wherein $R_2$ has the meaning given under formula I, n denotes 2, and Me represents an alkali metal cation.

The reaction is preferably performed in an inert solvent. Suitable solvents are, e.g., alcohols such as methanol, ethanol, ethers such as tetrahydrofuran or dioxane, also N,N-dimethylformamide and dimethylsulphoxide. Particularly suitable solvents are polyvalent, partially etherified alcohols such as methylcellosolve or glycol monomethyl ether. The reaction temperatures are between 0° and the reflux temperature of the reaction medium, preferably between 80° and 100°C.

Thiadiazole derivatives of formula I wherein n denotes 1 or 2 are produced according to the invention by the oxidation of a thiadiazole derivative of formula IV

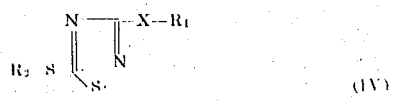

In formula IV, $R_1$, X and $R_2$ have the above given meanings.

This oxidation can be carried out in the usual manner with peroxy acids, e.g., with peroxyacetic acid or peroxybenzoic acid, also with hydrogen peroxide or potassium permanganate. The reaction is performed in a solvent. Preferred solvents in this case are chlorinated hydrocarbons, e.g., methylene chloride, chloroform, carbon tetrachloride or chlorobenzene.

The 5-chlorothiadiazoles of formula II required as starting materials can be obtained by reaction of compounds of formula V

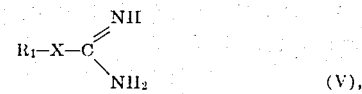

wherein $R_1$ and X have the meanings given under formula I, with perchloromethylmercaptan (trichloromethanesulphenic acid chloride) in the presence of an acid-binding agent, e.g., alkali hydroxide, in an inert solvent such as, e.g. methylene chloride, chloroform, benzene or toluene. (cp. J. Goerdeler et al. Chem. Ber. 90, 182, 1957, ibid. 90, 892, 1957).

Compounds of formula V wherein X represents oxygen or sulphur are obtained, for example, if alcohols or thiols derived from $R_1$ according to the above definition are reacted in ether, and in the presence of hydrogen chloride, with cyanamide (unstabilised). Furthermore, compounds of formula V wherein X represents sulphur can be produced by the reaction of halides derived from $R_1$ with thiourea to give the corresponding isothiuronium salts.

The reaction of compounds of formula V with perchloromethylmercaptan is advantageously performed by a process in which a compound of formula V is placed into one of the above mentioned solvents, an addition made of perchloromethylmercaptan, and then at 0° of the amount of aqueous alkali hydroxide required for the binding of the formed hydrochloric acid. Depending on whether the compound of formula V is used in the free form or in the form of its hydrochloride, the added amount of alkali hydroxide amounts to 3 to 4 moles per mole of compound V.

The compounds of formula I are colourless substances which are obtained in some cases in crystalline form, and in some cases in the form of oily liquids. The production of the compounds of formula I is further illustrated by the following examples.

EXAMPLE 1

3-Methoxy-5-methylsulphonyl-1,2,4-thiadiazole

An amount of 15 g (0.1 mole) of 3-methoxy-5-chloro-1,2,4-thiadiazole is heated together with 10 g (0.1 mole) of the sodium salt of methanesulphinic acid in 100 ml of methylcellosolve for 1 hour at 100°C. The reaction mixture is then poured into 1 litre of water, and extracted twice with 150 ml of methylene chloride. The extract is dried, the methylene chloride evaporated off, and the residue recrystallised from carbon tetrachloride. There is obtained an amount of 12 g (62 percent of theory) of 3-methoxy-5-methylsulphonyl-1,2,4-thiadiazole in the form of colourless needles, M.P. 76°C.

The 3-methoxy-5-chloro-1,2,4-thiadiazole used as starting material can be produced as follows:

An amount of 110 g of methylisourea hydrochloride (1 mole) is suspended in 1 litre of methylene chloride in a 2.5 litre sulphating flask fitted with a high-speed stirrer, a dropping funnel, an internal thermometer and a cooling bath. After the addition of 186 g (1 mole) of perchloromethylmercaptan, 160 g of sodium hydroxide solution dissolved in 1 litre of water is added dropwise at 0°. After 2 hours' stirring, the undissolved material is removed by filtration; the organic phase is separated in a separating funnel, dried with $Na_2SO_4$, and evaporated in a rotary evaporator. The brown residue is extracted by stirring twice with 1 litre of ligroin (M.P. 80°–90°C); the ligroin fractions are combined and distilled. The product corresponds to the fraction having the B.P. 66°–69°C/14 mm.

EXAMPLE 2

3-Dimethylamino-5-methylsulphonyl-1,2,4-thiadiazole

A mixture of 16.5 g (0.1 mole) of 3-dimethylamino-5-chloro-1,2,4-thiadiazole (obtained analogously to the preceding example), 100 ml of methylcellosolve and 10 g of methyl sulphinate sodium salt is stirred for 1 hour at 100°C in a 350 ml sulphating flask fitted with stirrer and internal thermometer. The whole is then poured into 1 litre of water, and extracted three times with 100 ml of methylene chloride. After drying with $MgSO_4$ and concentration by evaporation, the product can be recrystallised from methanol, and 16 g (77 percent of theory) of colourless crystals, M.P. 70°–71°C, are obtained.

| Analysis for $C_5H_9N_3O_2S_2$ | | | | | | | (MG 207) | | |
|---|---|---|---|---|---|---|---|---|---|
| calculated: | C | 29.0 | H | 4.3 | N | 20.3 | O | 15.5 | |
| found: | | 29.5 | | 4.6 | | 19.8 | | 15.7 | |

EXAMPLE 3

3-Methylmercapto-5-methylsulphonyl-1,2,4-thiadiazole

A 250 ml three-necked flask is fitted with dropping funnel, stirrer, internal thermometer and heating bath. In this flask there is dissolved an amount of 17.8 g (0.1 mole) of 3,5-bis(methylmercapto)-1,2,4-thiadiazole in 100 ml of glacial acetic acid and 50 ml of methylene chloride. An addition is made dropwise at 40°–50°C of a mixture of 29.3 g of 52 percent peroxyacetic acid (0.2 mole) and 50 ml of glacial acetic acid. After stirring at 60°C until a drop of the mixture no longer produces any discolouration on potassium iodide starch paper, the whole is poured into 500 ml of water, and extracted four times with 50 ml of methylene chloride. The combined organic phases are dried over anhydr. $Na_2SO_4$ and concentrated by evaporation. After recrystallisation from ethanol, there is obtained 11 g of colourless crystals, M.P. 72°–74°C (53 percent of theory).

| Analysis for $C_4H_6N_2O_2S_3$ | | | | | | |
|---|---|---|---|---|---|---|
| calculated: | C | 22.7 | H | 2.9 | N | 13.3 |
| found: | | 22.74 | | 2.87 | | 13.58 |

The following compounds of formula I are obtained by the methods described in Examples 1-3:

| Compound: | Melting point |
|---|---|
| 3-methylthio-5-methylsulphinyl-1,2,4-thiadiazole | 40°C |
| 3-ethylthio-5-methylsulphonyl-1,2,4-thiadiazole | 52–53°C |
| 3-(2'-chloroallylthio)-5-methylsulphonyl-1,2,4-thiadiazole | 40–41°C |

DESCRIPTION OF TESTS

A. Soil test

An amount of 500 ppm of active substance is worked by thorough mixing into dry sterilised soil.

A sample of 100 ccm of this soil is placed into each of a number of plastic containers of 250 ccm content.

About 10 sterilised oat grains are inserted below the surface of the soil in each of these containers, the said grains being interpenetrated with mycelia of each of the following fungi species:

*Fusarium oxysporum, Pythium debaryanum, Rhizoctonia solani, Verbicillium albo atrum.*

The soil in each container is then moistened with 34 ml of distilled water, and the containers are incubated at 20°–24°C.

The results of the tests are evaluated after 5 days, the basis of the evaluation being a determination of whether mycelia have grown from the grains into the surrounding soil.

Of the substances of formula I tested, the following, for example, are found in particular to have an excellent action: 3-methylthio-5-methylsulphonyl-1,2,4-thiadiazole, 3-ethylthio-5-methylsulphonyl-1,2,4-thiadiazole, and 3-dimethylamino-5-methylsulphonyl-1,2,4-thiadiazole.

B. Dressing test

Wheat is artificially infested with the fungus *Fusarium nivale*. The wheat is then dressed with 200 ppm of active substance, and laid out on moist filter paper in Petri dishes.

An evaluation is made after 10 days' incubation at 20°–24°C of the development of mycelia.

The following compound of formula I exhibits, for example, an excellent action:
3-methylthio-5-methylsulphonyl-1,2,4-thiadiazole.

C. Dish test

The solution of the active substance is mixed with the still hot nutrient agar, and the solution poured into dishes. After solidification, the test germs are applied, and incubated for 48 hours at 37°C. It is possible by a variation of the added amount of active substance to determine the minimum concentration to effect inhibition of growth.

I. Bacteria

The following strains of bacteria were examined:
*Staphylococcus aureus*
*Escherichia coli*
*Staphylococcus faecalis*
*Brevibacterium ammoniagenes*
*Sarcina ureae*
*Proteus vulgaris*
*Bacillus subtilis*
*Salmonella pullorum*
*Mycobacterium phtei*
*Corynebacterium diphteroides*

The compounds of formula I exhibit a very good action; for example: 5-methylsulphonyl-3-methylthio- 1,2,4-thiadiazole, 5-methylsulphonyl-3-(2'-chloroallyl-thio)-1,2,4-thiadiazole, and 5-methylsulphonyl-3-ethylthio-1,2,4-thiadiazole.

II. Fungi

The following strains were examined:
Epidermophyton floceosum
Trichophyton gypseum
Candida albicans
Saccharomyces cereversiae
Fusarium oxysporum
Torula utilis
Aspergillus flavus
Penicillium expansum
Aspergillus niger
Pullularia pullulans
Coniophora cerebella
Poria vaporaria
Lenzites abietina
Polystictus versicolor
Fomes annosus
Alternaria tenuis The compounds of formula I exhibit a very good action; for example: 5-methylsulphonyl-3-methoxy-1,2,4-thiadiazole.

D. Inhibition-zone test
Method

The active substances are applied, in the exhaust or pad dyeing process, from solutions having varying contents of active substance to textile or paper rondelles. The solvent used is ethylene glycol monomethyl ether. The plates known as two-layer agar plates are employed as nutrient agar. These consist of one layer of bacto agar and one layer of the agar suitable for the corresponding test organisms. This second layer is inoculated beforehand with the test germs. The rondelles treated with the active substance are then placed on to these plates and incubated for 24 hours at 37°. The growth of the test organisms on and under the rondelles is subsequently evaluated.

The following test organisms were used:

| Bacteria: | Staphylococcus aureus SG 511 | (nutrient agar + potassium tellurite) |
| | Escherichia coli | (nutrient agar) |
| Fungi: | Aspergillus niger | (wort agar) |
| | Candida albicans | (wort agar) |

A very good action is exhibited, for example, by the following compound:
5-methylsulphonyl-3-methoxy-1,2,4-thiadiazole.

E. Disinfection test

The active substances are applied in the exhaust process (foulard) from solutions containing varying amounts of active substance to textile or paper rondelles. These specimens are then inoculated with suspensions (physiological saline solutions having a 10% bouillon content) of the various test organisms. The rondelles are then incubated in a moist chamber for 24 hours at 37°C, and then washed out in 20 cm³ of physiological saline solution (containing for the blocking of the active substance polyoxyethylene-sorbitol-monooleate). Aliquot parts of this solution are taken and spread out on to suitable nutrient media. The nutrient media are then incubated for 24 hours at 37°C. The test organisms used were those mentioned under 2. The number of living germs compared with the number on the control specimen is subsequently determined.

The following were used as test organisms:
Staphylococcus aureus
Escherichia coli
Aspergillus niger ATCC
Candida albicans A very good action is shown, for example, by the following compound:
5-methylsulphonyl-3-methoxy-1,2,4-thiadiazole.

F. Mould test

Paper rondelles to which the active substances have been applied in the pad dyeing process are placed on to a sterile wort-agar plate, and inoculated with a germ suspension of the test organisms. The paper rondelles are then incubated for 3 days at 28°C with 75–85 percent relative humidity. An estimation is subsequently made of the occurred growth on and under the specimens.

The following are used as test organisms:
Penicillium expansum
Aspergillus niger
Alternaria tenuis A very good action is shown, for example, by the compound 5-methylsulphonyl-3-methoxy-1,2,4-thiadiazole.

G. Microbicidal activity in paints
Method x Parts of active substance are firstly dissolved in 5 parts of a 1:1 mixture of dimethylformamide and ethylene glycol monomethyl ether, and the solution homogeneously stirred with (90-x) parts of a commercial dispersion paint having a base of polyvinylacetate-ethylacrylate-copolymer and 5 parts of water to form a brushable paint. A coat of this is then applied to filter paper, e.g. Whatmann 3 MM, and the applied coat allowed to dry for 3 days at room temperature. The specimens are subsequently exposed to the air for 8 days in an air duct at 65° with 80–90 relative humidity. The specimens are then cut up and placed on to inoculated agar plates. (fungi coating facing upwards, bacteria coating downwards)

The following were used as test organisms:

| Fungi: | Pullularia pullulans | |
| | Paecilomyces varioti | |
| | Penicillium cyclopium | |
| | Aspergillus oryzae | Sabouraud-maltose-agar |
| | Chaetomium globosum | |
| | Aspergillus niger | |
| | Candida albicans | |
| Bacteria: | Staphylococcus aureus | nutrient agar |
| | Escherichia coli | |

The plates are then incubated:
Fungi: 7 days at 28° with 70–80 percent relative humidity;
Bacteria: 24 hours at 37° with 60 percent relative humidity.

Of the substances of formula I examined, excellent activity is shown, for example, by the compound 5-methylsulphonyl-3-methylthio-1,2,4-thiadiazole.

H. Dry rot

Samples of various types of wood are dried for 16 to 20 hours at 105° for determination of the dry weight. The specimens are then impregnated, with application of a vacuum, with acetone active substance solutions of varying concentration. The amount of absorbed active substance is determined by re-weighing the specimens.

Furthermore, powder bottles are half filled with quartz sand and 15 cm³ of a nutrient solution: glucose, peptone dissolved in a phosphate buffer, malt extract. A piece of wood of a type suitable for the growth of the fungus (feeder-block) is inserted into the quartz sand, inoculated with the fungus culture, and pre-incubated for a period of 3 weeks.

The samples of wood impregnated with the active substance are placed on to the obtained even furry coatings of fungi. This arrangement is maintained for 2 months at 24°C. The fungus growth and the quality of the wood are then assessed. The specimens are subsequently exposed to fresh air for 4 weeks in an air duct at 65°, and a further assessment of fungus growth made. The following were used as test organisms and types of wood:

| | | |
|---|---|---|
| Coniophora cerebella | on pine | (Pinus silvestris) |
| Coriulus versicolor | on beech | (Fagus silvatica) |
| Poria incarnata | on liden | (Tilia spec.) |

I. Plastics

PVC-Sheets having a preserving and sterilising action are produced by a process in which 0.5 g of the active substance is dissolved in 5 g of methylcellosolve, and the solution then mixed with 55.0 g of PVC-paste (in 5 g of ligroin); the mixture is homogenised and pressed out on a plate at 180°C to form sheets. The composition of the PVC-paste is as follows:

73 parts by weight of PVC GEON 120 × 203
2 parts by weight of dibutyl tin dilaurate
15 parts by weight of dibutyl sebacate
10 parts by weight of dioctylphthalate
10 parts by weight of ligroin, boiling range 80°–110°C 100 parts by weight of PVC-paste These sheets are then tested in 3 ways for determination of their microbicidal and fungistatic action:

Test 1

Complete agar culture media having $10^6$ microorganisms per cm³ of agar are prepared in a dish; round samples of the sheet material are placed on to the nutrient substrate, and the dish incubated at 37°C for 24 hours. A substance is assessed as being effective when no further growth of organisms under the round sample of sheet occurs.

Test 2

The biocidal action is confirmed by a test in which a suspension having ca. $10^6$ microorganisms is maintained in contact, on a carrier, e.g. paper, with a plastic disk for 6 hours at 37°C. The whole is afterwards thoroughly washed in a physiological saline solution, and a bouillon culture then inoculated with one equivalent of this solution. If the substance being tested is active, there is no longer any germ capable of propagation.

Test 3

The plastics-preserving action of the products is confirmed by a test in which an agar is offered without a carbon source to ca. $10^5$ of the microorganisms to be examined, and specimens of the PVC-sheet added. After 14 days at 26°–28°C, the loss in weight of dibutyl sebacate and the physical constants of the PVC-sheet, modified by the loss of softening agent, are determined. In the case of positively effective active substances, the loss in weight remains smaller than 10 percent of the original amount of dibutyl sebacate.

| Examined organisms | |
|---|---|
| Test 1 | Staphylococcus aureus SG 511 |
| Test 2 | Escherichia coli 8196 |
| | Candida albicans 22 |
| | Aspergillus niger ATCC 6275 |
| | Salmonella pullorum VBIZ 23 |
| Test 3 | Aspergillus niger ATCC 6275 |
| | Penicillium funiculosum |
| | Paec. varioli |
| | Trich. viride |
| | Chaet. phobosum |

Of the substances of formula I examined, particularly good activity is shown by the compound 3-phenylthio-5-methylsulphony-1,2,4-thiadiazole.

The thiadiazole derivatives of formula I can be used generally as fungicides. In particular, compounds of formula I can serve as soil fungicides, i.e., for the control of fungi which infest parts of plants present in the soil (roots, base of stalks, seeds, tubers and seedlings, young plants, and other parts of plants serving to provide propagation, such as, e.g.:

| | | |
|---|---|---|
| Plasmodiophora species | e.g. | Plasmodiophora brassicae |
| Aphanomyces species | e.g. | Aphanomyces laevis |
| Pythium species | e.g. | Pythium ultimum |
| | | Pythium debaryanum |
| Phytophthora species | e.g. | Phytophthora infestans |
| | | Phytophthora cactorum |
| | | Phytophthora cinnamoni |
| Mycosphaerella species | e.g. | Mycosphaerella fragariae |
| Ophiobolus species | e.g. | Ophiobolus graminis |
| Cochliobolus (=Helminthosporium) species | e.g. | Helminthosporium sativum |
| | | Helminthosporium oryzae |
| | | Helminthosporium teres |
| Pellicularia species | e.g. | Pellicularia filamentora (=Rhizoctonia solani) |
| | | Pellicularia sasakii |
| Thielaviospsis species | e.g. | Thielaviospsis basicola |
| Verticillium species | e.g. | Verticillium albo-atrum |
| Phialophora species | e.g. | Phialophora cineresceus |
| Fusarium species | e.g. | Fusarium oxysporum |
| | | Fusarium nivale |
| Phoma species | e.g. | Phoma betae |
| Sclerotium species | e.g. | Sclerotium rolfsii |
| Septoria species | e.g. | Septoria nodorum |
| Ustillago species | e.g. | Ustilago zeae |
| | | Ustilago avenae |
| | | Ustilago nuda |
| Tilletia species | e.g. | Tilletia caries |
| Urocystis and | e.g. | Urocystis cepulae |
| Tuburcinia species | | Tuburcinia occulta |

Furthermore, compounds of formula I wherein n denotes 1 or 2 can be used for the protection of organic materials, such as wood, paper, textiles, paints and plastics, against infestation by harmful microorganisms, particularly for the disinfection and preservation of these materials.

The methods of application of the thiadiazole derivatives of formula I for the control of microorganisms, especially of bacteria and fungi, and for the protection of organic materials and objects against infestation by microorganisms, are very varied. The said thiadiazole derivatives can be worked directly into the material to be protected, e.g. into material having a synthetic resin base, such as polyamides and polyvinyl chloride, into paper-treatment liquors, into printing thickeners made from starch or from cellulose derivatives, into lacquers and paints containing, for example, casein, into spun rayon, into viscose spinning solutions, into paper, into animal mucus or oils, into permanent coatings based on polyvinyl alcohol, into cosmetic articles, and into ointments or powders. Furthermore, they can be added also to preparations of inorganic or organic pigments for the painting trade, and to softeners, etc..

By combination of the compounds according to the invention with interface-active, especially wash-active, substances, detergents and cleansing agents are obtained which have an excellent antibacterial or antimycotic action. Aqueous preparations of such detergents and cleansing agents containing compounds according to the invention are suitable as antimicrobial cleansing agents, especially in the foodstuff and drink industry, e.g., in breweries, dairies and abattoirs.

Moreover, the thiadiazole derivatives of formula I can be employed in the form of their organic solutions, e.g., as so-called 'sprays', or as dry-cleaning agents or for the impregnation of wood; suitable organic solvents for these applications are preferably non-water-miscible solvents, particularly petroleum fractions, but also water-miscible solvents such as lower alcohols, e.g., methanol or ethanol, or ethylene glycol monomethyl ether or -monoethyl ether. A number of the new compounds can also be used in aqueous solution.

For disinfection and preservation purposes, the compounds of formula I can also be used in combination with known antimicrobial agents. These include, e.g.:

Halogens and halogen compounds with active halogen e.g., sodium hypochlorite, calcium hypochlorite, chloride of lime,
sodium-p-toluenesulphochloramide, p-toluenesulphodichloramide,
N-chlorosuccinimide, 1,3-dichloro-5,5-dimethylhydantoin,
trichloroisocyanuric acid, potassium dichloroisocyanurate,
iodine, iodotrichloride, complex compounds of iodine and
iodotrichloride with surface-active agents such as polyvinylpyrrolidone,
alkylphenoxypolyglycols, polyoxypropylene glycols, alkylaminoethanesulphonic acids and -sulphonates, alkylarylsulphonates,
and quaternary ammonium compounds.
Boron compounds
e.g., boric acid and borax.
Metal-organic compounds
e.g., bis-tributyltin oxide, triphenyltin hydroxide, tributyltin
salycylate, tributyltin chloride, phenylmercury borate, phenyl-mercury
acetate.
Alcohols
e.g., hexyl alcohol, trichloroisobutyl alcohol, 1,2-propylene
glycol, triethylene glycol, benzyl alcohol, 4-chlorobenzyl
alcohol, 2,4- and 3,4-dichlorobenzyl alcohol, 2-phenylethyl
alcohol, 2-(4-chlorophenyl)-ethyl alcohol, ethylene glycol
monophenyl ether, menthol, linalool, and 2-bromo-2-nitropropanediol-1,3.
Aldehydes
e.g., formaldehyde, paraformaldehyde, glutaraldehyde, benzaldehyde,
4-chlorobenzaldehyde, 2,4- and 3,4-dichlorobenzaldehyde,
cinnamic aldehyde, salicylic aldehyde, 3,5-dibromosalicylic
aldehyde, 4-hydroxybenzaldehyde, anisaldehyde, and vanillin.
Carboxylic acids and derivatives
e.g., trichloroacetic acid, monobromoacetic acid glycol ester,
Na- and Ca-propionat, caprylic acid, undecylenic acid,
Zn-undecylenate, sorbic acid, K- and Ca-sorbate, lactic acid,
malonic acid, aconitic acid, citric acid, benzoic acid, 4-chlorobenzoic acid, benzoic acid benzyl ester, salicylic acid,
4-chlorosalicyclic acid-n-butylamide, salicylanilide, 2,-4',5-tribromosalicylanilide,
3,3',4',5-tetrachlorosalicylanilide,
4-hydroxybenzoic acid, 4-hydroxybenzoic acid ethyl ester,
gallic acid, madelic acid, phenylpropiolic acid, phenoxyacetic
acid, dehydracetic acid, vanillic acid propyl ester.
Phenols
e.g., phenol, mono- and polychlorophenols, cresols, 4-chloro-3-methylphenol,
4-chloro-3,5-dimethylphenol, thymol, 4-chlorothymol,
4-t-amylphenol, saligenin, 4-n-hexylresorcin, carvacrol,
2-phenylphenol, 2-benzyl-4-chlorophenol, 2,2'-dihydroxy-5,5'-dichlorodiphenylmethane,
2,2'-dihydroxy-3,3',5,5',6,6'-hexachlorodiphenylmethane,
2,2'-dihydroxy-5,5'-dichlorodiphenylsulphide,
2,2'-dihydroxy-3,3',5,5'-tetrachlorodiphenylsulphide,
2-hydroxy-2',4,4'-trichlorodiphenyl ether, and dibromosalicyl.
Quinones
e.g., 2,5-dimethylquinone, 2,3,5,6-tetrachlorobenzoquinone,
2,3-dichloro-1,4-naphthoquinone.
Carbonic acid derivatives
e.g., pyrocarbonic acid diethyl ester, tetramethylthiuramdisulphide,
3,4,4'-trichloro-N,N'-diphenylurea, 3-trifluoromethyl-4,4'-dichloro-N,N'-diphenylurea,
N-3-trifluoromethylphenyl-N'-2-ethylhexylurea,
1,6-bis-(4'-chlorophenyl-diguanidino)-hexane,
dodecylmethyl-guanidine acetate, ammonium rhodanide, 4,4'-diamidino-α, ω-diphenoxy-hexane.
Amines
e.g., dodecylpropylenediamine, dodecyldiethylenetriamine,
diaminobenzene-dihydroiodide.
Quaternary ammonium compounds
e.g., alkyl-dimethyl-benzyl-ammonium chloride, alkyl-dimethyl-ethylbenzyl-ammonium
chloride, dodecyl-dimethyl-3,4-dichlorobenzylammonium
chloride, dodecyl-di-(2-hydroxyethyl)-benzyl-ammonium
chloride, dodecyl-di-(2-hydroethyl)-benzyl-ammonium pentachlorophenolate,
dodecyl-di-(2-hydroxyethyl)-benzyl-ammonium-4-methylbenzoate,
dodecyl-dimethyl-phenoxyethyl-ammonium bromide, 4-diisobutyl-phenoxyethoxyethyl-dimethyl-benzylammonium
chloride, 4-diisobutyl-cresoxyethoxyethyl-dimethyl-benzyl-ammonium
chloride, dimethyl-didecyl-ammonium chloride, cetyl-trimethylammonium bromide, dodecyl-pyridinium chloride,
cetylpyridinium chloride, dodecyl-isoquinolinium chloride,
decamethylene-bis-4-aminoquinalidinium dichloride, α-(p-tolyl)-dodecyl-trimethyl-ammonium methosulphate, (dodecanoyl-N-methyl-aminoethyl)-(phenylcarbamoyl-methyl)-dimethyl-ammonium chloride.
Quaternary phosphonium compounds
e.g., dodecyl-triphenyl-phosphonium bromide.
Amphoteric compounds
e.g., dodecyl-di-(aminoethyl)-glycin.
Heterocyclic compounds
e.g., 2-mercaptopyridine-N-oxide, Na- and Zn-salt of 2-mercaptopyridine-N-oxide,
2,2'-dithiopyridine-1,1'-di-N-oxide, 8-hydroxyquinoline,
5-chloro-8-hydroxyquinoline, 5-chloro-7-iodo-8-hydroxyquinoline,
5,7-dichloro-8-hydroxyquinoline, 5,7-dichloro-8-hydroxyquinaldine,
bis-2-methyl-4-amino-quinolyl-carbamidehydrochloride,
2-mercaptobenzthiazole, 2-(2'-hydroxy-3',5'-dichlorophenyl)-5-chlorobenzimidazole,
2-aminoacridinehydrochloride,
5,6-dichlorobenzoxazolone, 1-dodecyl-2-iminoimidazoline-hydrochloride,
6-chlorobenzisothiazolone.

Furthermore, the compounds of formula I can be used, together with wetting or dispersing agents, in the form of their aqueous dispersions, e.g., for the protection of substances which have a tendency to rot, such as for the protection of leather, paper, etc..

Solutions or dispersions of active substances, which can be used for the protection of these materials, advantageously have a content of active substance of at least 0.005 g/litre, e.g., 0.01 to 5, preferably 0.1 to 3 g/litre.

The new thiadiazole derivatives can moreover be used with particular advantage for the production of antimicrobially finished plastics sheet material, e.g., made from polyvinyl chloride. Such sheet materials are valuable packing materials for goods which have to be protected against infestation by harmful microorganisms.

The compounds of formula I are also suitable for the control of such phytopathogenic fungi which damge seeds, and of the spores thereof; as well as for the protection of the seeds against such fungi. The compounds according to the invention can therefore be used with success as seed dressing agents.

All types of seed can be treated according to the invention and effectively protected against fungi infestation; e.g., seeds of wheat, rye, barley, oats, maize, rice, cotton, sugar beet, vegetables, tubers such as potatoes, etc.. The dressing agents according to the invention render possible the control of practically all phytopathogenic fungi and their spores which damage seeds present in the soil, and which lead to serious parasitic plant diseases, particularly to the known blight and mould diseases. The following phytopathogenic fungi, amongst others, can be controlled with the dressing agents according to the invention:
blight fungi
(e.g., *Tilletia tritici, Ustilago tritici, Ustilago undae, Ustilago avenea, Ustilago ceae*)
snow mould
(*Fusarium nivale*)
root fungi
(*Rhizoctonia solani*)
stem break diseases
(*Pythium species*)

The treatment with the dressing agents embracing compounds of formula I suggested according to the invention can be carried out, in a manner known per se, by the wet or dry dressing treatment. In the case of the wet treatment, the seeds are sprinkled with or immersed in a solution or dispersion containing the dressing agent, and afterwards dried. The concentration of active substance in such a liquid dressing preparation is 0.01 – 4 percent by weight, preferably 0.1 to 1 percent by weight. In the dry dressing treatment, the seeds are dusted on the surface with the dressing agent used in a finely dispersed form. The employed amount of dressing agent should be such that, after treatment, the applied amount is 0.01 – 10 g, preferably 0.1 – 3.0 g, of active substance per 1 kg of seed. The dressing agents used according to the invention can contain, besides the liquid or solid carriers, emulsifiers, dispersing agents, auxiliaries and distributing agents, as well as agents for increasing adhesiveness, and surface-active agents. Suitable liquid carriers can be aqueous systems, and also organic solvents or diluents. The agents used according to the invention contain, as solid carriers, finely dispersed or pulverulent, preferably inert materials, especially mineral or inorganic products. Naturally, the dressing agent preparations used according to the invention can contain, in appropriate concentrations, further active substances suitable for plant protection, such as, e.g., insecticides, nematocides, rodenticides, and agents protecting against damage caused by birds.

A preferred field of application for the thiadiazoles of formula I consists in the sterilisation of goods being washed, and in the protection of goods being washed against infestation by microorganisms. For this purpose, rinsing liquors are used which contain the mentioned thiadiazoles advantageously in concentrations of ca. 5–200 parts per million, relative to the liquor.

The rinsing liquor can also contain conventional auxiliaries such as optical brighteners, softeners, acid reacting salts such as ammonium- or zinc-silicofluoride, or certain organic acids such as oxalic acid, also finishing agents, e.g., those based on synthetic resin, or starch.

Regarding materials to be washed which can be sterilised by rinsing liquors containing compounds according to the invention, these are, in particular, organic fibre materials, namely, such of natural origin, such as cellulose-containing material, e.g., cotton, or polypeptide-containing material, e.g., wool or silk; or fibre material of synthetic origin, such as that based on polyamide, polyacrylonitrile or polyester; or mixtures of the above mentioned fibres.

The thiadiazole derivatives according to the invention impart, in the previously mentioned concentrations, both to the liquor and to the material treated therewith, a substantial and residual sterility against Staphylococcus and Coli forms, which is retained even after exposure to light of the active substance or of the material treated therewith. They are distinguished by their stability in light on the washed material treated therewith, as well as by their high activity and sphere of action against gram-positive and gram-negative organisms.

Of particular value is the applicability of the new thiadiazole derivatives of formula I according to the invention as active substances for the therapy of diseased conditions of the skin, of the intestinal system and of the urinary passages of the warm-blooded animal, which follows from the excellent action against pathogenic bacteria and fungi, the relatively slight toxicity, as well as the elimination occuring to a great extent in the unmodified effective form from the body.

The antimicrobial agents according to the invention contain at least one thiadiazole derivative of formula I as active substance, together with the usual pharmaceutical carriers. The nature of the carriers is governed considerably by the field of application. For external application, for example, for the disinfection of healthy skin as for the disinfection of wounds, and for the treatment of dermatosis and infections of the mucous membrane caused by bacteria or fungi, ointments, powders and tinctures are particularly suitable. Foundations for ointments can be anhydrous, they can consist, for example, of mixtures of wool fat and vaseline; or they can be aqueous emulsions in which the active substance is suspended. Suitable carriers for powders are, e.g., starches such as rice starch, which, optionally, can be made specifically lighter, e.g., by the addition of highly dispersed silicic acid, or heavier by the addition of talcum.

Tinctures contain at least one thiadiazole derivative of formula I in aqueous, particularly 45–75 percent, ethanol, to which is optionally added 10–20 percent of glycerin. Also solutions are suitable, particularly for disinfection of healthy skin, the solutions being prepared with the aid of the usual solubility-promoting agents such as, e.g., polyethylene glycol, as well as optionally with the aid of emulsifiers. The content of active substance in the aforementioned external preparations is preferably between 0.1 and 5 percent.

In all preparations, whether for technical, agricultural, cosmetic, hygienic or medicinal fields of application, the new thiadiazole derivatives of formula I can be present as the sole active substances, or combined with other known bactericidal and, in particular, fungicidal active substances, e.g., for the broadening of the sphere of action. Suitable substances for mixing or combining with the new thiadiazole derivatives of formula I are, for example, as follows:

elementary sulphur
ammonium polysulphide and metal polysulphides
boric acid and borates
nickel sulphate
potassium chromate
copper (I) oxide (KUPFEROXID)
Bordeaux broth and further inorganic and organic copper salts
bis-(tri-n-butyl tin)oxide
triphenyl tin hydroxide (FENTINHYDROXID)
triphenyl tin acetate (FENTINACETAT) and further organic tin compounds
methyl mercury-8-hydroxyquinolate (Ortho LM)
N-(methyl mercury)-1,4,5,6,7,7-hexachlorobicyclo[2.2.1]hept-5-ene-2,3-dicarboximide
N-(ethylmercury)-1,4,5,6,7,7,-hexachlorobicyclo[2,2.1]hept-5-ene-2,3-dicarboximide
N-(ethyl mercury)-p-toluenesulphonic anilide
phenyl mercury acetate (PMA)
phenyl mercury urea
mixture of ethyl mercury-2,3-dihydroxypropyl mercaptide and
ethyl mercury acetate and further inorganic and organic mercury compounds
0,0-diethyl-phthalimidiphosphonothioate
5-amino-bis-(dimethylamido)phosphinyl-3-phenyl-1,2,4-triazole (TRIAMIPHOS)
5-methylamino-bis-(dimethylamido)-phosphinyl-3-phenyl-1,2,4-triazole
0,0-diethyl-0-2-pyrazinyl-phophoro thioate
0-ethyl-S,S-diphenyl-phosphorodithioate
0-ethyl-S-benzyl-phenyl phosphonodithiote
0,0-diisopropyl-S-benzyl-phosphorothioate
0-butyl-S-ethyl-S-benzyl-phosphorodithioate
0-pentachlorophenyl-bis-(dimethylamido)-phosphate
0-ethyl-S-benzyl-phenyl-phosphonate
diethylamido-benzenethiophosphonic-2-methyl-imidazolide
methylbromide
methyl isocyanate
1,3-dichloropropene and related halogenated $C_3$ and $C_4$ hydrocarbons
1-chloro-2-nitro-propane
2-chloro-1-nitropropane
dichlorotetrafluoroacetone
sorbic acid and its potassium salts
dodecylguanidine acetate (dodine)
dodecylguanidine phthalate
acetylene dicarboxylic diamide
1,2,-dicyano-1,2-dichloroethylene
1,2-dichloro-1-(methylsulphonyl)ethylene
1,2-dichloro-1-(butylsulphonyl)ethylene
trans-1,2-bis-(n-propylsulphonyl)ethylene
bis-(1,2-trichloroethyl)sulphoxide
bis-(n-propyl-chlorodifluoromethylthio)- sulphone diamide
p-dichlorobenzene
hexachlorobenzene (HCB)
1,2,4-tetrachloro-4-nitrobenzene TECNACEN)
pentachloronitrobenzene (QUINTAZEN)
isomer mixture of 1,3,4-trichloro-2,6-dinitrobenzene and 1,2,3-trichloro-4,6-dinitrobenzene
2,4,5,6-tetrachloroisophthalic nitrile
2,4-dinitrophenyl-thiocyanate
diphenyl
o-nitrodiphenyl
1-chloro-2,4-dinitronaphthalene
2,4,6-trichlorophenyl
2,4,5-trichlorophenyl-chloroacetate
trichlorophenol, zinc salt
m-cresyl acetate
2,3,4,6-tetrachlorophenol
pentachlorophenol (PCP)
o-dihydroxybenzene
2,4-dioxy-n-hexylbenzene
2-phenylphenol 3,5-dibromosalicylaldehyde
2-benzyl-4-chlorophenol
2,2'-dihydroxy-5,5'-dichloro-diphenylmethane (DICHLORPHEN)
2,2'-dihydroxy-3,3',5,5',6,6'-hexachloro-diphenylmethane
2,2'-dihydroxy-5,5'-dichloro-diphenylsulphide
2,2'-dihydroxy-3,3',5,5'-tetrachloro-diphenylsulphide
disodium-2,2'-dihydroxy-3,3'5,5'-tetrachloro-diphenylsulphide
4-chloro-o-phenylphenol
1,4-dichloro-2,5-dimethoxybenzene (CHLORNEB)
salicylanilide
1,2-bis-(3-methoxycarbonyl-2-thiourea)-benzene
1,2-bis-(3-ethoxycarbonyl-2-thiourea)-benzene
(3,5-dimethyl-4-chlorophenoxy)-ethanol
1,4-dichloro-2,5-dimethoxybenzene
2,4,5-trichlorophenylsulphonylmethylthiocyanate
phenylmercapto-methanesulphonamide
2-(1-methyl-n-propyl)-4,6-dinitrophenyl-2-methylcrotonate
 (BINAPACRYL)
2-(1-methyl-n-propyl)4,6-dinitrophenylisopropylcarbonate
 (DINOEUTON)
2-(1-methyl-n-heptyl)-4,6-dinitrophenylcrotonate (DINOCAP)
methyl-2,6-dinitro-4-(1-ethyl-hexyl)phenylcarbonate
 +
methyl-2,6-dinitro-4-(1-propyl-pentyl)phenylcarbonate (DINOCTON)
4-nonyl-2,6-dinitro-phenylbutyrate
S-methyl-2-(1-methyl-n-heptyl)-4,6-dinitrophenylthiocarbonate
1-(3,4-dichloroanilino)-1-formylamino-2,2,2-trichloroethane
2,6-dichloro-4-nitroaniline (DICHLORAN)
2-cyanoethyl-N-phenylcarbamate
propynyl-N-phenylcarbamate
2-methyl-benzoic anilide
2-iodo-benzoic anilide
2-chloro-benzoic anilide
2,3,5,6-tetrachloro-benzoquinone (1,4) (CHLOROANIL)
2,3-dichloro-naphthoquinone(1,4) (DICHLON)
2-amino-3-chloro-naphthoquinone (1,4)
2-chloro-3-acetamino-naphthoquinone(1,4)
4-methyl-2,3,5,10-tetrahydro-3,5,10-trioxo-4H4-H-naphtho(2,3,-b)-1,4-thiazine
quinoximbenzoylhydrazone (BENQUINOX)
N-(trichloromethylthio)phthalimide (FOLPET)
N-(trichloromethylthio)cyclohex-4-ene-1,2-dicarboximide (CAPTAN)
N-(1,1,2,2-tetrachloroethylthio)cyclohex-4-ene-1,2-dicarboximide
 (CAPTAFOL)
N-(1,1,2,2,-tetrachloroethylthio)cyclohex-4-ene-1,2-dicarboximide
N'-dichlorofluoromethylthio-NN-dimethyl-N'-phenylsulphamide
 (DICHLOFLUANIDE)
S-(2-pyridyl-1-oxide)-S'-trichloromethyl-disulphide-hydrochloride
sodium-N-methyl-dithiocarbamate (METHAM)
sodium-N,N-dimethyl-dithiocarbamate (DDC)
zinc-N,N-dimethyl-dithiocarbamate (ZIRAM)
iron-N,N-dimethyl-dithiocarbamate (FERBAM)
disodium-ethylene-1,2-bis-dithiocarbamate (NABAM)
zinc-ethylene-1,2-bis-dithiocarbamate (ZINEB)
manganese (II) -ethylene 1,2-bis-dithiocarbamate (MANEB)
zinc-propylene-1,2-bis-dithiocarbamate (MEZINEB) (PROPINEB)
complex consisting of (MANEB) and zinc (MANCOZEB)
tetramethylthiuramdisulphide (THIRAM)
complex consisting of (ZINEB) and polyethylene thiuramdisulphide
 (METIRAM)
bis-(3,4-dichloro-2(5)-furanoyl)ether (mucochloric anhydride)
2-methoxymethyl-5-nitrofuran
5-nitro-furfuradoxime-(2)
5-nitro-fufuryl-amidoxime-(2)
1-oxy-3-acetyl-6-methyl-cyclohexene-(5)dione(2,4)- (dehydroacetic acid
4,5,6,7-tetrachlorophthalide
3-[2-(3,5-dimethyl-2-oxycyclohexyl)-2-hydroxyethyl]-glutarimide
 (cycloheximide)
phthalimide
pyridine-2-thiol-1-oxide and 1-hydroxypyridine-2-thione
α,α-bis(4-chlorophenyl)-3-pyridine-methanol (PARINOL)
8-hydroxyquinoline (3-QUINOLINOL)
8-hydroxyquinoline-sulphate (CHINOSOL)
benzoyl-8-hydroxyquinoline-salicylate
6-ethoxy-1,2-dihydro-2,2,4-trimethylquinoline (ETHOXYQUIN)
N-lauryl-isoquinolinium bromide
9-(p-n-hexyloxyphenyl)-10-methyl-acridinium chloride
2-n-heptadecylimidazoline acetate (GLYODIN)
1-hydroxyethyl-2-heptadecylimidazoline
1-phenyl-3,5-dimethyl.4-nitrosopyrazole
1-p-chlorophenyl-3,5-dimethyl-4-nitrosoopyrazole
N-(1-phenyl-2-nitropropyl)piperazine
N,N'-bis[1-formamido-2,2,2-trichloroethyl]-piperazine
2-dimethylamino-6-methyl-5-n-butyl-4-hydroxy-pyrimidine
N-dodecyl-1,4,5,6-tetrahydropyrimidine
N-dodecyl-2-methyl-1,4,5,6-tetrahydroxypyrimidine
2-n-heptadecyltetrahydropyrimidine
1-(4-amino-4-propyl-5-pyrimidyl-methyl)-2-methyl-pyridiniumchloride hydrochloride
2-(2'-furyl)-benzimidazole (FUBERIDAZOL)
3-dodecyl-1-methyl-2-phenylbenzimidazolium ferricyanide
methyl-n-benzimidazol-2-yl-N-(butylcarbamoyl)carbamate (BENOMYL)
2-(o-chloroanilino)-4,6-dichloro-sym.triazine
2-ethylamino-6-methyl-5-n-butyl-4-hydroxypyrimidine
2,6-dichloro-3,5-dicyano-4-phenylpyridine
α-(2,4-dichlorophenyl)-α-phenyl-5-pyrimidine-methynol
5-chloro-4-phenyl-1,2-dithiol-3-one
2,3-dicyano-1,4-dithia-anthraquinone (DITHIANON)
2-(4-thiazolyl)-benzimidazole 4-(2-chlorophenylhydrazono)-3-methyl-5-isoxazolone (DRAZOXOLON)
thiazolidinone-4-thione(2) (RHODANIN)
3-(p-chlorophenyl)-5-methylrhodanine
3,5-dimethyltetrahydro-1-3,5-thiadiazine-2-thione (DAZOMET)
3,3'-acetylene-bis-(tetrahydro-4,6-dimethyl)-2H-1,3,5-thiadiazine-2-thione) (MILNEB)
3-benzylidene-amino-4-phenylthiazoline-2-thione
6-chlorobenzthiazole-2-thiole, zinc salt
6-β-diethylamino-ethoxy-2-dimethylamino-benzthiazole-dihydrochloride
monoethanolammonium-benzthiazole-2-thiole
laurylpyridinium-5-chloro-2-mercaptobenzthiazole
6-(β-diethylaminoethoxy) 2-dimethylaminobenzthiazole-dihydrochloride
3-trichloromethylthiobenzothiazolone
3-trichloromethylthiobenzoxazolone
3-(trichloromethyl)-5-ethoxy-1,2,4-thiadiazole
6-methyl-2-oxo-1,3-dithiolo[4,5-b]-quinoxaline (QUINOMETHIONAT)
2-thio-1,3-dithiolo[4,5-b]-quinoxaline (THIOQUINOX)
2,3-dihydro-5-carboxanilido-6-methyl-1,4-oxathiine
2,3-dihydro-5-carboxanilido-6-methyl-1,4-oxathiine-4,4-dioxide
2,3-dihydro-5-carbox-o-diphenylamido-6-methyl-1,4-oxathiine
N-cyclododecyl-2,6-dimethylmorpholine acetate
N.tridecyl-2,6-dimethylmorpholine
3-(3',5'-dichlorophenyl)-5,5-dimethyloxazolidine-2,4-dione
cetyl-trimethylammonium bromide
n-alkyl($C_{12},C_{14},C_{16}$)dimethylbenzylammonium chloride
dialkyldimethylammonium bromide
alkyldimethylbenzylammonium chloride
alkyl $C_9$–$C_{15}$ tolylmethyltrimethylammonium chloride
p-di-isobutylphenoxyethoxyethyldimethylbenzylammonium chloride
gliotoxin
2,4-diguanidino-3,5,6-trihydroxycyclohexyl-5-deoxy-2-0-(2-deoxy-2-methylamino-α-L-glucopyranoxyl)3-C-formyl-β-L-lyxopentano-furanoside (STREPTOMYCIN)
7-chloro-4,6-dimethoxycumaran-3-one-2-spiro-1'-(2'-methoxy-6'-methylcyclohex-2'-ene-4'-one (GRISEOFULVIN)
4-dimethylamino-1,4,4a,5,5a,6,11, 12a-octahydro-3,5,6,10,12,12a-hexahydroxy-6-methyl-1,11-dioxo-2-naphthacenecarboximide (OXYTETRACYCLIN)
7-chloro-4-dimethylamino-1,4,4a,5,5a,6,11,12a-octahydro-3,6,10,12,12a-pentahydroxy-6-methyl-1,11-dioxo-2-naphthacenecarboximide (CHLORTETRACYCLIN)
(PIMARCIN)
(LANCOMYCIN)
(PHLEOMYCIN)
(KASUGAMYCIN)
(PHYTOACTIN)
D(-)-threo-2,2-dichloro-N-3-hydroxy-a-(hydroxymethyl)-p-nitrophenethyl-acetamide (CHLORAMPHENICOL)
blasticidin-S-methyl-benzylamino-benzenesulphonate
N-(3,5-dichlorophenyl)-succinimide
N-(3,5-dichlorophenyl)-itaconimide
N-(3-nitrophenyl)-itaconimide
phenoxyacetic acid
sodium-p-dimethylamino-benzenediazosulphonate
acrolein-phenylhydrazone
2-chloroacetaldehyde-(2,4-dinitrophenyl)-hydrazone
2-chloro-3-(tolysulphonyl)-propionitrile
1-chloro-2-phenyl-pentane-diol(4,5)-thione(3)
p-nonylphenoxypolyethyleneoxyethanol iodine complex
(α-nitromethyl)-o-chlorobenzythioethylamine hydrochloride
3-(p-t.butyl-phenylsulphonyl)-acrylonitrile
octachlorocyclohexenone
pentachlorobenzyl alcohol
pentachlorobenzyl acetate
pentachlorobenzaldehyde cyanohydrin
2-norcamphane-methanol
2,6-bis-(dimethylaminoethyl)-cyclohexanone
decachloro-octahydro-1,3,4-metheno-2H-cyclobuta[cd]pentalen-2-one
1-(3-chloroallyl)-3,5,7-triaza-1-azonia-adamantane chloride Preferably, the compounds of formula I can be combined with halogenated salicylic acid alkylamides and -anilidenes, with halogenated diphenylureas, with halogenated benzoxazoles or benzoxazolones, with polychlorohydroxydiphenylmethanes, with halogenodihydroxy-diphenylsulphides, with bactericidal 2-iminoimidazolidines or -tetrahydropyrimidines or with bactericidal and fungicidal quaternary compounds, or with certain dithiocarbamic acid derivatives, such as with tetramethyl-thiuramdisulphide, with fungicidal amidines, carbamoyloximes. It is also possible, optionally, to use carriers having favourable inherent effects, such as, for example, sulphur as a powder foundation, or zinc stearate as constituent of ointment foundations.

Some typical preparations for various fields of application are described in the following examples:

Dust

The following substances are used for the preparation of a 2 percent dust:
2 parts of the active substance of formula I,
5 parts of colloidal silica, and
93 parts of talcum.

The active substance is intimately mixed and ground with the carriers. The fungicidal dust obtained in this manner is used for the dusting of plants.

Wettable powder

The following substances are used for the preparation of (a) a 25 percent and (b) a 40 percent wettable powder:

a.
25 parts of active substance of formula I,
10 parts of a 1:1 mixture of $C_8$–$C_{18}$-alkanol-polyglycol ether and kieselguhr,
35 parts of kieselguhr, and
30 parts of colloidal silica;

b.
40 parts of active substance of formula I,
10 parts of a 2:3 mixture of $C_8$–$C_{18}$-alkylphenoxypolyoxyethylene glycol and silica, and
50 parts of silica.

The active substances are absorbed on to the carriers, and the whole subsequently mixed and ground with the stated additives. A wettable powder is obtained having excellent wetting and suspension properties. It is possible to obtain from such wettable powders, by dilution with water, suspensions of any desired concentration of active substance, the said suspensions being used for the treatment of cultivated plants.

Emulsion concentrate

The following substances are used for the preparation of (a) a 10 percent and (b) a 20 percent emulsion concentrate:

a.
10 parts of active substance of formula I,
15 parts of ethoxyethanol,
15 parts of dimethylformamide,
50 parts of mineral oil with a high content of aromatics, and
10 parts of a combination-emulsifier consisting of the calcium salt of dodecylbenzenesulphonic acid and an alkylarylpolyglycol ether (e.g. "Emullat P 140 HFP," manufactured by Union Chimique S.A., Brussels);

b.
20 parts of active substance of formula I,
70 parts of xylene, and
10 parts of a combination-emulsifier consisting of the calcium salt of dodecylbenzenesulphonic acid and an alkylarylpolyglycol ether (e.g. "Emullat P 140 HFP," manufactured by Union Chimique S.A., Brussels).

The active substances are dissolved in xylene or in the solvent mixture, and the combination-emulsifiers are then added to these solutions. Emulsion concentrates are obtained which can be diluted with water to obtain emulsions of any desired concentration. Such emulsions are suitable for the treatment of cultivated plants.

Granulate

The following substances are used for the preparation of a 2 percent granulate:

4 parts of a 1:1 mixture of the active substance of formula I with silica,
92 parts of granulated limestone,
3 parts of a mixture of 0.5 part of $C_8$–$C_9$ alkylphenoxypolyoxyethylene glycol and 2.5 parts of polyethylene glycol, and
1 part of kieselguhr.

The ground limestone is impregnated with the polyethylene glycol mixture, and the whole mixed with the mixture of active substance and silica. Kieselguhr is then added as an anticaking agent. This granulate is particularly suitable for the treatment of plant soil.

Seed dressing agent

A. A dry dressing agent of the following composition was used:
20 percent by weight of a compound of formula I,
1 percent by weight of paraffin oil, and
79 percent by weight of talcum.

An amount of 600 g of this agent, which possesses good adhesiveness on seed grains, is placed together with 100 kg of barley seed into a tightly sealing rotary drum. The filled drum is rotated for 45 minutes, after which time practically the whole amount of the employed agent is located as a coating on the grains of the seed.

B. A wet dressing agent of the following composition was used:
23.00 percent by weight of a compound of formula I,
1.65 percent by weight of alkarylpolyglycol ether (emulsifier),
1.65 percent by weight of $NaHSO_4 \cdot H_2O$, finely ground,
73.70 percent by weight of diethylene glycol monoethyl ether acetate.

A bath was prepared consisting of 250 g of the above agent and 15 litres of water at room temperature, the bath preparation being thoroughly mixed. This aqueous preparation is poured over 100 kg of rye seed. The seed is then allowed to drain on a sieve, and subsequently well dried.

C. A wet dressing agent of the following composition was used:
65.0 percent by weight of a compound of formula I,
18.0 percent by weight of precipitated, hydrated, amorphous silica,
5.0 percent by weight of coconut oil fatty alcohol polyglycol ether having 8 moles of ethylene oxide per mole of fatty alcohol,
4.0 percent by weight of adhesive (containing 50 percent of polyvinyl alcohol),
8.0 percent by weight of kaolin (finely powdered).

An amount of 50 g of this agent is dispersed with 3.5 litres of water. This aqueous suspension is used to spray 100 kg of oat seed, the seed being thoroughly worked through, so that the whole amount of liquid is taken up by the grains of seed. The seed, only slightly moist, is subsequently dried.

What we claim is:

1. A thiadiazole derivative of the formula

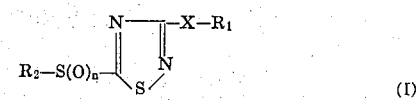

(I)

wherein
$R_1$ represents alkyl having 1–4 carbon atoms, unsubstituted, or mono- to trisubstituted by halogen alkoxy or alkylamino each having at most four carbon atoms, alkenyl having 2–4 carbon atoms, or cycloalkyl or cycloalkenyl having 3–7 carbon atoms,
X represents oxygen, sulphur or methyl-imino,
$R_2$ represents alkyl having 1–4 carbon atoms, unsubstituted, or mono- to disubstituted by halogen, and
n represents 1 or 2.

2. Thiadiazole derivative according to claim 1, wherein
$R_1$ represents methyl or ethyl,
X represents sulphur,
$R_2$ represents methyl or ethyl, and
n represents 1 or 2.

3. Thiadiazole derivative according to claim 1, which corresponds to the formula

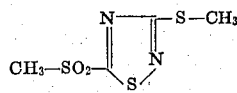

4. Thiadiazole derivative according to claim 1, which corresponds to the formula

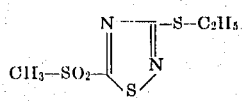

5. Thiadiazole derivative according to claim 1, which corresponds to the formula
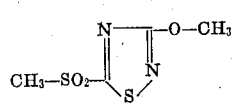
6. Thiadiazole derivative according to claim 3, which corresponds to the formula
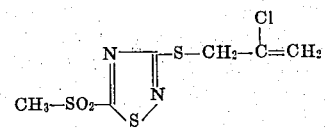
* * * * *